(12) United States Patent
Ebashi et al.

(10) Patent No.: US 6,477,910 B2
(45) Date of Patent: Nov. 12, 2002

(54) ADJUSTMENT SYSTEM IN AN AUTOMATIC TRANSMISSION

(75) Inventors: Akio Ebashi, Tokyo (JP); Tomoyuki Ohata, Tokyo (JP)

(73) Assignee: Niles Parts Co., Ltd. (JP)

( * ) Notice: Subject to any disclaimer, the term of this patent is extended or adjusted under 35 U.S.C. 154(b) by 0 days.

(21) Appl. No.: 09/917,887

(22) Filed: Jul. 31, 2001

(65) Prior Publication Data

US 2002/0019287 A1 Feb. 14, 2002

(30) Foreign Application Priority Data

Aug. 3, 2000 (JP) ........................................ 2000-235588

(51) Int. Cl.[7] ............................................... F16H 59/00
(52) U.S. Cl. ........................................................ 74/335
(58) Field of Search ............................................ 74/335

(56) References Cited

U.S. PATENT DOCUMENTS

| | | | | |
|---|---|---|---|---|
| 4,911,031 A | * | 3/1990 | Yoshimura et al. | ............ 74/335 |
| 5,094,115 A | * | 3/1992 | Mishihira et al. | .............. 74/335 |
| 5,219,391 A | * | 6/1993 | Edelen et al. | .................. 74/335 |
| 6,065,363 A | * | 5/2000 | Schaller et al. | .......... 74/473.12 |
| 6,073,507 A | * | 6/2000 | Ota et al. | ...................... 74/335 |

FOREIGN PATENT DOCUMENTS

JP      HEI5-141523      6/1993

* cited by examiner

*Primary Examiner*—Dirk Wright
(74) *Attorney, Agent, or Firm*—Rader, Fishman, & Grauer PLLC; Ronald P. Kananen, Esq.

(57) ABSTRACT

An automatic transmission including an electric actuator, a shift operating unit, rotation position detecting means, a locating unit for locating a manual shaft, and a controlling unit for driving and controlling the actuator is constructed of an electric current detecting unit for detecting a driving current of the actuator, a shifting position calculating unit for calculating a shifting position of the manual shaft on the basis of detection by the electric current detecting unit of a change in the driving current of the actuator at the time when a detent pin gets over a convex to be fitted in a predetermined concave in shifting, and a rotation position detection learning unit for learning a relation between the shifting position calculated by the shifting position calculating unit and an output value of the rotation position detecting unit.

5 Claims, 9 Drawing Sheets

ADJUSTMENT SYSTEM IN AN AUTOMATIC TRANSMISSION

BACKGROUND OF THE INVENTION

1. Field of the Invention

The present invention relates to an adjustment system in an automatic transmission for an automobile.

2. Description of the Related Art

Figure 9:
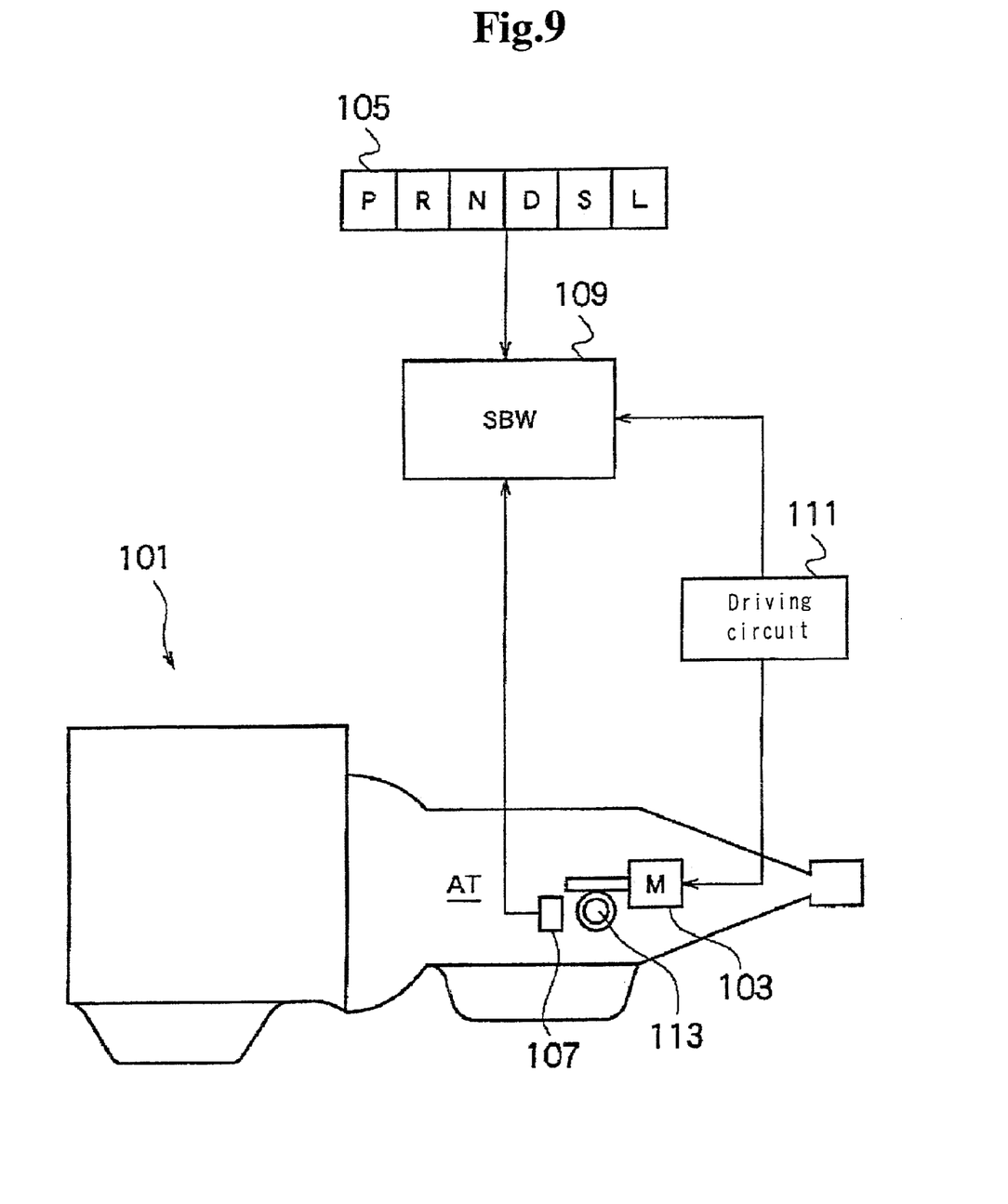
FIG. 9 is a block diagram according to the related art.

There has been known such automatic transmission as shown in FIG. 9, the transmission which described in a bullet of the Japanese Patent Laid-Open No. 141523/1993, for example. The automatic transmission 101 shown in FIG. 9 mentioned above comprises an actuator 103, a shift operating unit 105, a rotation position detecting unit 107 and a controlling unit 109.

The actuator 103 comprises an electric motor and is connected to a driving circuit 111 connected to the controlling unit 109. The actuator 103 rotates a manual shaft 113 so as to switch a shifting position. The shift operating unit 105 comprises a selecting switch and instructs a shifting position to output an instruction signal to the controlling unit 109. The rotation position detecting unit 107 comprises, for example, a potentiometer and detects a rotation angle of the manual shaft 113 to input a detection signal to the controlling unit 109. The controlling unit 109 receives the instruction signal from the operating unit 105 to output the signal to the driving circuit 111 until the rotation position detected by the rotation position detecting unit 107 accords with the instructed shifting position, and controls and drives the actuator 103.

Therefore, when an operator operates the shift operating unit 105 to instruct the shifting position, the controlling unit 109 controls the manual shaft 113 to be rotated to the instructed shifting position so that gears of the automatic transmission 101 can be shifted.

When the rotation position detecting unit 107 comprises a potentiometer, the rotation position detecting unit 107 outputs a voltage value, which is schematically proportional to a rotation angle of the manual shaft 113, to detect a rotation angle. The rotation position detecting unit 107 is mounted such that a point of a voltage value corresponding to a point N (neutral range) of the rotation position detecting unit 107 would accord with a position of the neutral range N of the manual shaft 113. Thus, in the case that rotation of the manual shaft 113 changes the shifting position, such as P (parking range) and D (driving range) can be detected by means of a voltage value outputted by the rotation position detecting unit 107.

In such mounting, however, the point N of the potentiometer is likely to be different from that of manual shaft due to wrong mounting. Further, dispersion of a resistance value of the potentiometer itself in manufacturing is likely to make a difference between a resistance value corresponding to each shifting position and a design value. Moreover, there is also likely to be a little difference in respective gear position from the design value due to individual difference of the automatic transmission 101.

SUMMARY OF THE INVENTION

The invention is aimed to provide an adjustment system in an automatic transmission capable of learning a relation between the shifting position and an output value of the rotation position detecting unit after mounting thereof in a simple construction.

An invention according to a first aspect is concerned with an adjustment system in an automatic transmission including: an electric actuator for switching a shifting position by rotating a manual shaft; a shift operating unit for instructing the shifting position to output an instruction signal; a rotation position detecting unit for detecting a rotation angle of the manual shaft on the basis of an output signal corresponding to the rotation angle; a locating unit, which is provided with a concave and convex portion corresponding to the each shifting position, for locating the manual shaft by a detent pin getting over a convex to be fitted in a predetermined concave in shifting; and a controlling unit for driving and controlling the actuator until a rotation position, which is detected by the rotation position detecting unit in response to the receipt of the instruction signal from the shift operating unit, accords with the instructed shifting position, wherein the adjustment system comprises an electric current detecting unit for detecting a driving current of the actuator; a shifting position calculating unit for calculating a shifting position of the manual shaft on the basis of detection by the electric current detecting unit of a change in the driving current of the actuator at the time when the detent pin gets over a convex to be fitted in a predetermined concave in shifting described above; and rotation position detection learning unit for learning a relation between the shifting position calculated by the shifting position calculating unit and an output value of the rotation position detecting unit.

An invention according to a second aspect is concerned with the adjustment system in an automatic transmission according to the first aspect, wherein the electric current detecting unit detects a change in a driving current at the time when the manual shaft is rotated back and forth so that the actuator can switch all the shifting positions back and forth, and the shifting position calculating unit calculates all the shifting positions on the basis of the change in the driving current.

An invention according to a third aspect is concerned with an adjustment system in an automatic transmission including: an electric actuator for switching a shifting position by rotating a manual shaft; a shift operating unit for instructing the above-mentioned shifting position to output an instruction signal; an inhibitor switch for detecting the shifting point; a rotation position detecting unit for detecting a rotation angle of the manual shaft; and a controlling unit for driving and controlling the actuator until a rotation position, which is detected by the rotation position detecting unit in response to the receipt of the instruction signal from the shift operating unit, accords with the instructed shifting position, wherein the adjustment system comprises a shifting position calculating unit for calculating a shifting position of the manual shaft on the basis of an output of the inhibitor switch in shifting; and a rotation position detection learning unit for learning a relation between the shifting position calculated by said shifting position calculating unit and an output value of the rotation position detecting unit.

An invention according to a fourth aspect is concerned with the adjustment system in an automatic transmission according to the third aspect, wherein the shifting position calculating unit calculates at least one shifting point of the manual shaft on the basis of rising and falling outputs of the inhibitor switch at the time when the actuator rotates the manual shaft so as to switch at least one shifting position.

An invention according to a fifth aspect is concerned with the adjustment system in an automatic transmission according to the third aspect, wherein the shifting position calculating unit calculates all the shifting positions of the manual shaft on the basis of rising and falling outputs of the inhibitor switch at the time when the actuator rotates the manual shaft so as to switch all the shifting positions.

In the invention according to the first aspect, when the shift operating unit instructs a shifting position, an instruction signal is inputted to the controlling unit, which drives and controls the actuator, so that the manual shaft would be rotated and driven to the instructed shifting position. When the rotation position of the manual shaft, which is detected by the rotation position detecting unit, accords with the shifting position instructed by the shift operating unit at that time, driving and controlling of the actuator are stopped and the manual shaft stays in the instructed shifting position. The detent pin, which is the locating unit, gets over a convex in shifting to be fitted in a predetermined concave corresponding to the shifting position, so that the manual shaft can be located. In such automatic transmission, the electric current detecting unit detects a driving current of the actuator and the shifting position calculating unit can calculate the shifting position of the manual shaft on the basis of a change in the driving current of the actuator at the time when the detent pin gets over a convex to be fitted in a predetermined concave in shifting. The rotation position detection learning unit can learn a relation between the shifting position calculated by the shifting position calculating unit and an output value of the rotation position detecting unit.

Therefore, the shifting position calculating unit can solve wrong mounting and calculate the shifting position of the manual shaft so that the output value of the rotation position detecting unit at the calculated shifting position would be the shifting position detected and outputted by the rotation position detecting unit. Thus, the shifting position of the manual shaft can be correctly corresponded to the output value of the rotation position detecting unit in a relation therebetween regardless of wrong mounting, dispersion of a resistance value of the rotation position detecting means in manufacturing, and individual difference of the automatic transmission, so that correct shifting can be achieved.

In the invention according to the second aspect, in addition to the effect of the invention according to the first aspect, the electric current detecting unit detects a change in the driving current at the time when the actuator rotates the manual shaft back and forth so as to switch all shifting positions back and forth, and the shifting position calculating unit can calculate all the shifting positions on the basis of the change in the driving current. Therefore, a relation between all the shifting positions calculated by solving such as wrong mounting and the output value of the rotation position detecting unit can be learned, so that more correct shifting can be achieved.

In the invention according to the third aspect, when the shift operating unit instructs the shifting position, an instruction signal is inputted to the controlling unit and the actuator is driven and controlled so that the manual shaft would be rotated to the instructed shifting position. When the rotation position detecting unit detects a rotation angle of the manual shaft at that time and the rotation position detected by the rotation position detecting unit accords with the instructed shifting position, driving and controlling of the actuator are stopped and the shifting is completed. The inhibitor switch detects the shifting position. In such automatic transmission, the shifting position calculating unit can calculate the shifting position of the manual shaft on the basis of an output of the inhibitor switch in shifting and the rotation position detection learning unit can learn a relation between the shifting position calculated by the shifting position calculating unit and an output value of the rotation position detecting unit. Thus, the relation between the shifting position of the manual shaft and an output value of the rotation position detecting unit can be correctly learned regardless of wrong mounting, dispersion of a resistance value of the rotation position detecting unit in manufacturing, and individual difference of the automatic transmission, so that correct shifting can be achieved.

In the invention according to the fourth aspect, in addition to the effect of the invention according to the third aspect, the shifting position calculating unit can calculate at least one shifting position of the manual shaft on the basis of rising and falling outputs of the inhibitor switch at the time when the actuator rotates the manual shaft so as to switch at least one shifting position. The relation between all the shifting positions and the output value of the rotation position detecting unit can be learned on the basis of the above at least one shifting position. Thus, correct shifting can be achieved.

In the invention according to the fifth aspect, in addition to the effect of the invention according to the third aspect, the shifting position calculating unit can calculate all the shifting positions of the manual shaft on the basis of rising and falling outputs of the inhibitor switch at the time when the actuator rotates the manual shaft so as to switch all the shifting positions. Thus, the relation between all the shifting positions calculated and the output value of the rotation position detecting unit can be learned, so that more correct shifting can be achieved.

DESCRIPTION OF THE PREFERRED EMBODIMENTS

First Embodiment

Figure 1:
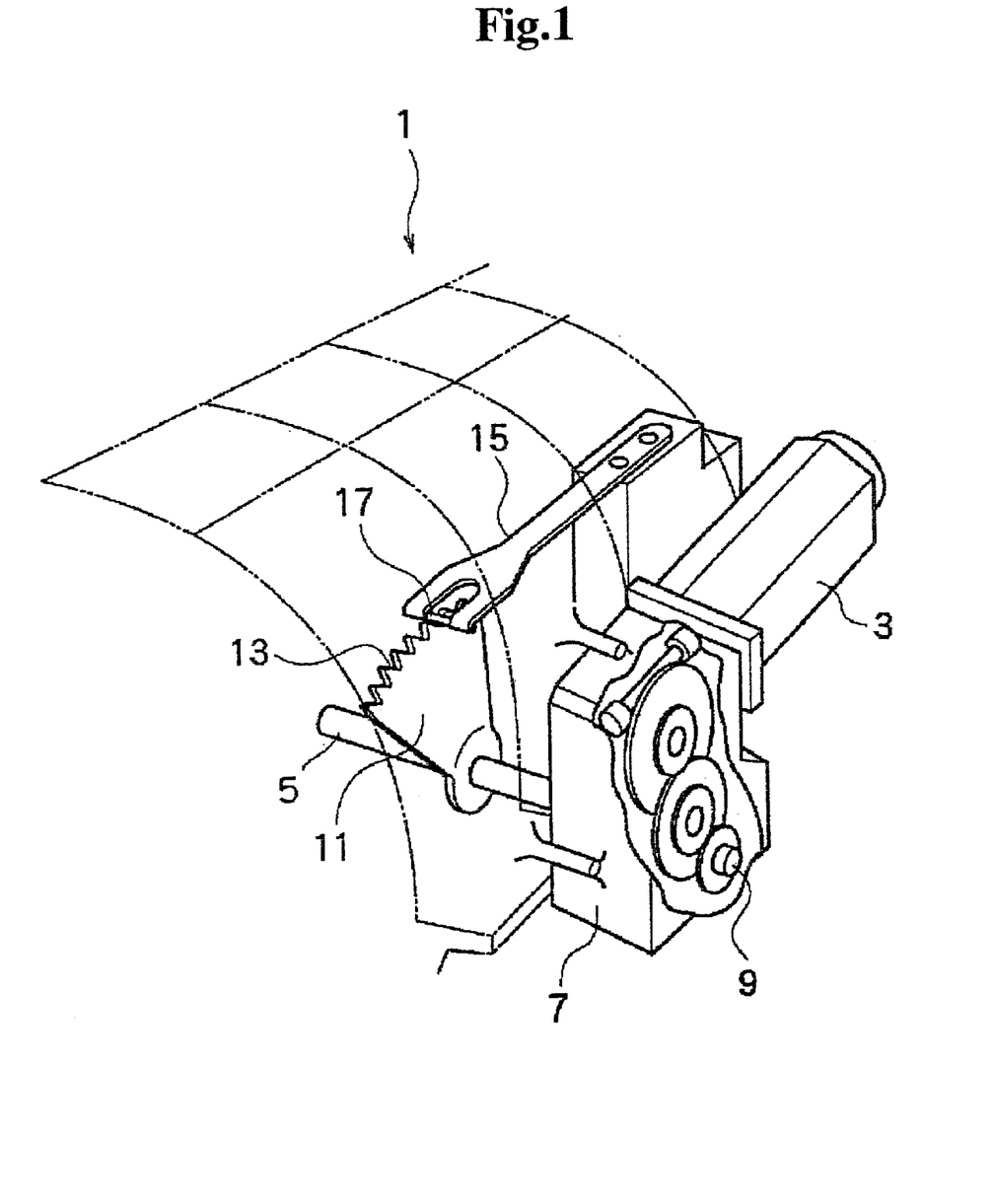
FIG. 1 is a schematic perspective view of a shift driving system in an automatic transmission according to the first embodiment of the invention.

FIG. 1 is a schematic perspective view of an integral part of an automatic transmission to which the first embodiment of the invention is applied. As shown in FIG. 1, an automatic transmission 1 to which the invention is applied is also provided with an electric actuator 3. This electric actuator 3 comprises, for example, a direct current motor and is connected to a manual shaft 5 through a reduction gear mechanism 7. The manual shaft 5 is arranged to interlock with a range switching valve. The range switching valve interlocks with the manual shaft 5 to enable the automatic transmission 1 to be shifted, when the actuator 3 rotates the manual shaft 5 through the reduction gear mechanism 7.

A potentiometer 9 is mounted as the rotation position detecting unit at an end portion of the manual shaft 5 on the outer surface of the reduction gear mechanism 7. The potentiometer 9 outputs a voltage value in accordance with a rotation angle of the manual shaft 5, so that the rotation angle of the manual shaft 5 can be detected by means of the voltage value.

A detent plate 11 is mounted to the manual shaft 5. The detent plate 11 is formed into the shape of a fan and provided on the upper outer periphery thereof with a plurality of concave and convex portions 13. A detent pin 17 supported at the end of a detent spring 15 is engaged with a predetermined concave of the concave and convex portion 13 so that locating of the manual shaft can be performed. That is, the detent plate 11 interlocks with the manual shaft 5 when the actuator 3 drives the manual shaft 5 to be rotated, so that the detent pin 17 would be fitted in a predetermined concave after getting over a convex, and thereby, locating of the manual shaft 5 after rotation can be performed.

Figure 2:
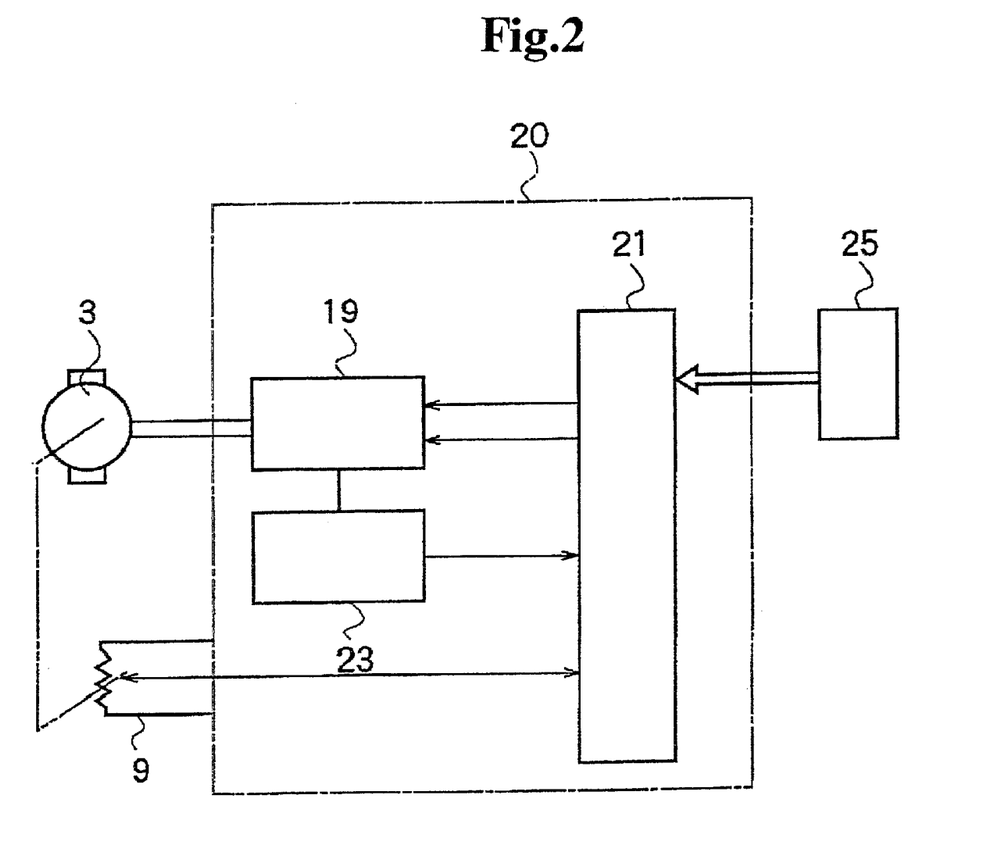
FIG. 2 is a block diagram of a system according to the first embodiment.

FIG. 2 is a block diagram of an adjustment system in an automatic transmission to which the first embodiment of the invention is applied.

The actuator 3 is connected to a controlling circuit 21 through an actuator driving circuit 19 of controlling unit 20. An electric current detecting circuit 23, which operates as electric current detecting unit, is arranged to be connected to the actuator driving circuit 19 to detect a driving current of the actuator 3 and to input the detected current to the controlling circuit 21. The potentiometer 9 interlocks with the actuator 3 and the detected signal is inputted to the controlling circuit 21.

An operation switch portion 25 is connected to the controlling circuit 21 as shift operating unit, so that an instruction signal would be inputted to the controlling circuit 21 when the operation switch portion 25 instructs a shifting position. The instruction signal of the operation switch portion 25 is such as a parking range P, a reverse range R, a neutral range N, and driving ranges D4, D3, D2, and D1.

In this embodiment, the controlling circuit 21 comprises shifting position calculating unit and rotation position detection learning unit. That is, the controlling circuit 21 calculates a shifting position of the manual shaft 5 on the basis of detection by the electric current detecting circuit 23 of change in the driving current of the actuator 3 at the time when the detent pin 17 gets over a convex of the detent plate 11 to be fitted in a predetermined concave. Then, the controlling circuit 21 learns a relation between the calculated shifting position and an output value of the potentiometer 9.

That is, though a point N of the potentiometer 9 is adjusted to a point N of the manual shaft 5 in order to mount the potentiometer 9 as shown in FIG. 1, there is a possibility in this arrangement that the points N of the potentiometer 9 and the manual shaft 5 would shift each other due to wrong mounting, for example, and further, that dispersion of a resistance value of the potentiometer 9 in manufacturing would vary a resistance value corresponding to each gear position. In these cases, it is required to learn a relation between the shifting position of the manual shaft 5 and an output value of the potentiometer 9 by solving the wrong mounting. This learning mechanism is shown in FIG. 3.

Figure 3:
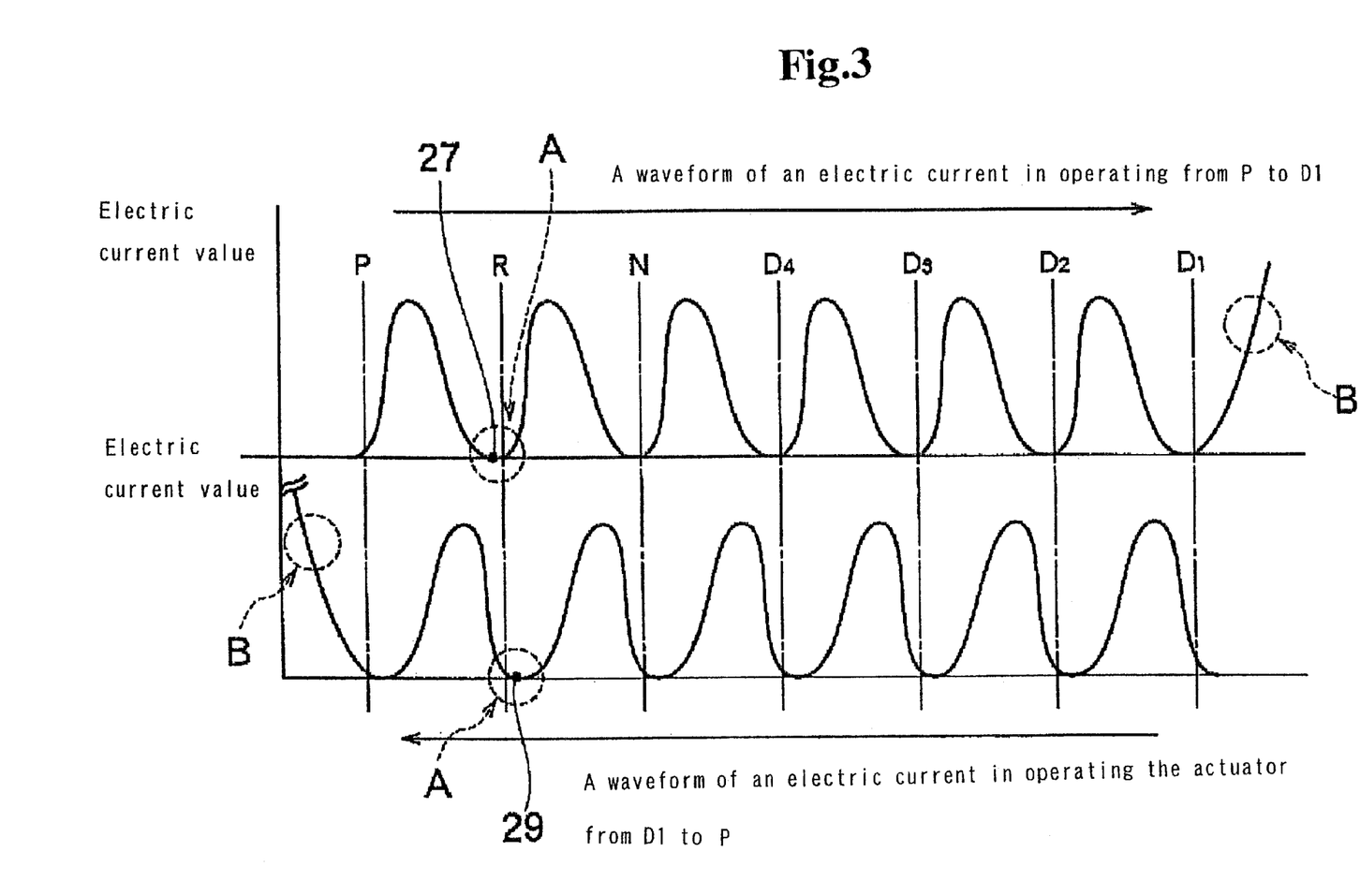
FIG. 3 is a graph showing a mechanism of learning according to the first embodiment.

FIG. 3 shows a change in the driving current at the time when the actuator 3 switches all shifting positions back and forth. In FIG. 3, the upper part shows a waveform of a driving current at the time when the manual shaft 5 is rotated in driving from the shifting position P to D1, while the lower part shows a waveform of a driving current at the time when the manual shaft 5 is rotated in driving from the shifting position D1 to P. As shown in FIG. 3, the electric current rapidly increases when the actuator 3 is driven so that the detent pin 17 would start to climb a convex of the detent plate 11, while it rapidly decreases when the detent pin 17 gets over the convex and be fitted to a concave. The shifting position of the manual shaft 5 can be calculated on the basis of the point where the electric current occurring at each shifting position P, R, N, D4, D3, D2 and D1 increases, since the detent plate 11 is mounted on the manual shaft 5 with correct locating.

As for the shifting position R, for example, a point 27 where an electric current rapidly increases exists in relation to an original shifting position R in driving from P to D1, as shown as a part A of the upper part in FIG. 3. Similarly, a point 29 where an electric current at a part A of the lower part in FIG. 3 rapidly increases also exists in driving from D1 to P. Thus, the output value of the potentiometer 9 at each of such points is stored in order as $P_{PD}$, $R_{PD}$, $N_{PD}$, $D4_{PD}$, $D3_{PD}$, $D2_{PD}$ and $D1_{PD}$ in the case of driving from P to D1. Similarly, the output value of the potentiometer 9 is stored in order as $P_{DP}$, $R_{DP}$, $N_{DP}$, $D4_{DP}$, $D3_{DP}$, $D2_{DP}$ and $D1_{DP}$ in the case of driving in the direction from D1 to P.

The point where the electric current rapidly increases can be easily detected by means of differential value of the waveform of a driving current. An operational limit in driving from P to D1 can be detected by the driving current of the actuator 3, which is continuously over a defined value set in advance at a part B of the upper part in FIG. 3. In the case of driving from D1 to P, the operational limit can also be detected by the driving current of the actuator 3, which is continuously over a defined value set in advance at an operational limiting portion on the P side as shown at a part B of the lower part in FIG. 3.

The fact that the driving current of the actuator 3 is continuously over the defined value set in advance is the case that 50A or more of electric current continuously flows for 100 msec or more, for example. It means that in a motor, although a rush current occurs at the time when the power turns on and a value of the rush current is sometimes almost same as a locking time current at the operational limit, in the case that the 50A or more electric current flows continuously for 100 msec or more, this current would be judged to be a locking time current at the operational limit and separated from the rush current since the value of the rush current decreases in some 10 msec.

From the value of each point at which the driving current increases rapidly and which is detected as described above, the output value of the potentiometer 9 that corresponds to the shifting position can be calculated by the following formula:

$$\text{shifting point } X = (x_{PD} + x_{DP})/2$$

wherein, x=P, R, N, D4, D3, D2, D1. Storing the above output value means that a relation between the shifting position, which is calculated after solving such as wrong mounting, and the output value of the potentiometer 9 would be learned.

Figure 4:
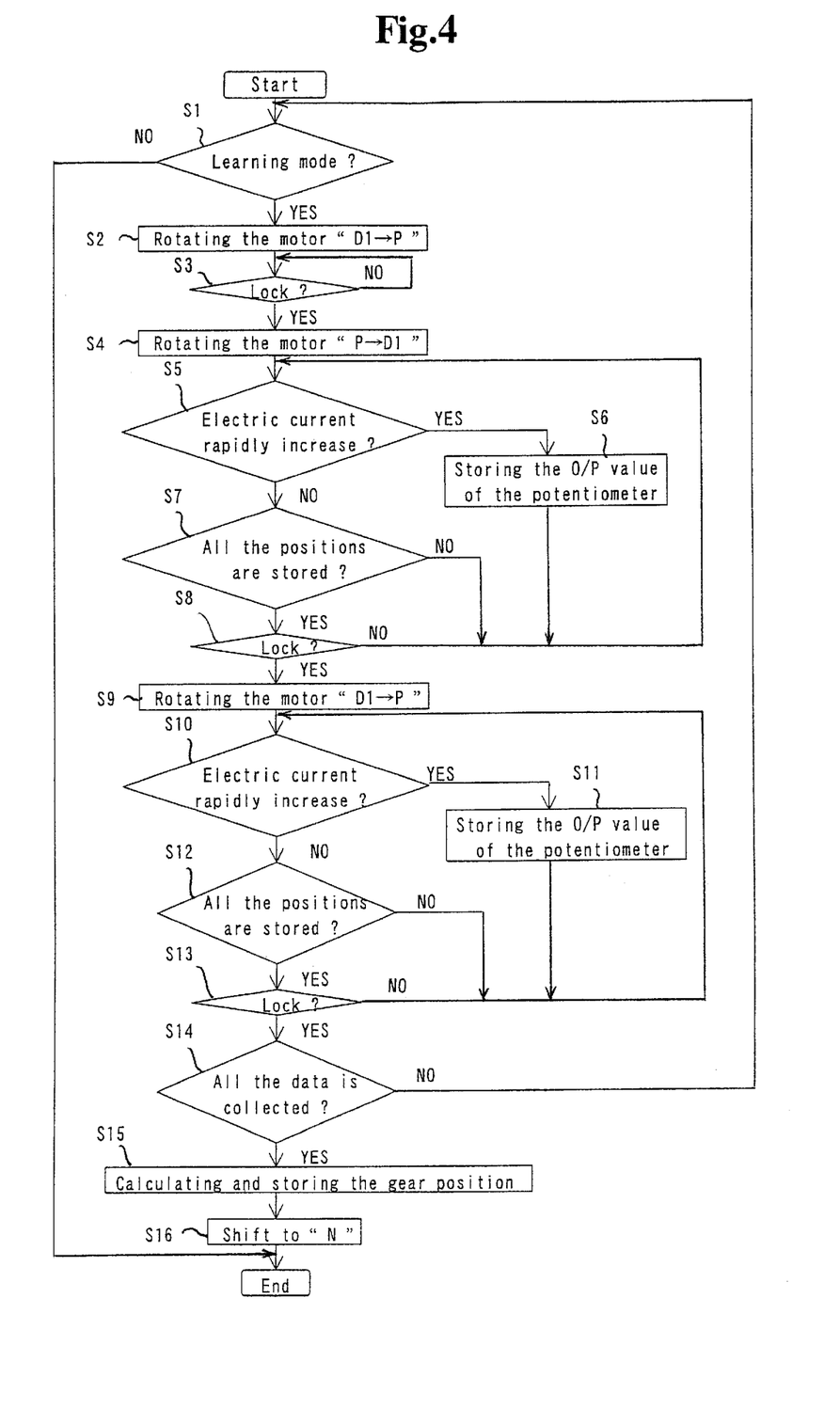
FIG. 4 is a flowchart according to the first embodiment.

Next, an operation of the above adjustment system will be described with reference to a flowchart shown in FIG. 4. First, a judgment whether the mode is a learning mode or not is performed in Step S1. In accordance with this judgment, the process goes to Step S2 when the controlling circuit 21 is set at the learning mode in order to carry out an inspection before shipment at a factory, for example; otherwise, the process ends as it is. When the controlling circuit 21 is set at the learning mode and the process goes from Step S1 to Step S2, a process of "rotating the motor in the direction from D1 to P" is carried out. This process makes the manual shaft 5 and the potentiometer 9 be driven to the direction of P from the condition where they are mounted so as to be adjusted to the point N.

In Step S3, it is judged "whether the lock is on or not". Step S3 is continued until the lock is made on, and the process goes to Step S4 when the lock is judged to be on. In Step S3, it is judged to be on the lock when the driving current is continuously over the defined value at the operational limit in the direction of P as described above.

In Step S4, a process of "rotating the motor in the direction from P to D1" is carried out. In this process, an operation that the actuator 3 is driven, the manual shaft 5 is rotated, and the detent pin 17 gets over a convex of the detent plate 11 to be fitted to a concave is carried out at all of the shifting positions (every position).

In Step S5, "whether the electric current rapidly increases or not" is judged. When it is judged in the above judgment that the electric current rapidly increases, the process goes to Step S6, while it goes to Step S7 in the case of judgment that the electric current does not rapidly increase.

In Step S6, an output value of the potentiometer 9 at that time is stored by means of the controlling circuit 21 in a process of "storing an output value of the potentiometer". After the storing, the detent pin 17 gets over a convex of the detent plate 11 to be fitted to a concave, so that the electric current would be judged not to increase rapidly in the second judgment in Step S5, and then, the process goes to Step S7, in which "whether all the positions are stored or not" is judged.

Steps S5, S6 and S7 are repeated until it is judged in Step S7 that all the positions from P to D1 are stored. The process goes to Step S8 when all the positions are judged to be stored.

In Step S8, it is judged "whether the lock is on or not". The process goes to Step S9 when it is judged that the lock is on by the driving current of the actuator 9 continuously over the defined value on the D1 side.

In Step S9, a process "rotating the motor in the direction from D1 to P" is carried out. In this process, the actuator 3 is reversed and the manual shaft 5 is rotated and driven from the D1 side to the P side.

In Step 10, "whether the electric current rapidly increases or not" is judged as well as in the step S5. The process goes to Step S11 when the electric current rapidly increases.

A process of "storing the output value of the potentiometer" is carried out in Step S11 as well as in the step S6, and "whether all the positions are stored or not" is judged in Step S12 as well as in the step S7. When all positions are stored, "whether the lock is on or not" is judged in Step S13 as well as in the step S8. The process goes to Step S14 when it is judged in Step S13 that the lock is on by the driving current of the actuator 3 continuously over the defined value at the operational limiting portion on the P side.

In Step S14, it is judged "whether all the data is collected or not". The processes from Step S1 are repeated again when it is judged that all the data is not collected. The process goes to Step S15 so that a process of "calculating and storing a gear position" would be carried out when it is judged in Step S14 that all the data is collected. In this process, the output value of the potentiometer 9 corresponding to the shifting position x is calculated by the above formula in accordance with the detecting result shown in FIG. 3 and is stored so that a relation between the shifting position and the output value of the potentiometer 9 would be learned. in the controlling circuit 21. This relation of the output value of the potentiometer 9 and the shifting position would be different a little from the design value due to wrong mounting, but learning the relation of the shifting position and the output value of the potentiometer 9 by solving the wrong mounting enables the potentiometer 9 to correctly detect each shifting position P, R or such.

In Step S16, a process of "shifting a gear to the position N" is carried out. The process ends after the actuator 3 drives the manual shaft 5 to be rotated to the position N.

According to such adjustment, the relation of the original shifting position P, R, N, D4, D3, D2 and D1 of the automatic transmission 1 and the output values of the potentiometer 9 can be stored with correct correspondence even when there is a difference in the shifting position due to wrong mounting, dispersion of a resistance value of the potentiometer 9 in manufacturing, or individual difference on a side of the automatic transmission 1, so that correct control can be performed.

The controlling circuit 21 outputs a control signal to the actuator driving circuit 19 so that the actuator driving circuit 19 drives the actuator 3 when a user operates the operation switch portion 25 to instruct the shifting positions P, R, N, D4, D3, D2 and D1 on the basis of such learning, and thereby, the manual shaft 5 is rotated via the reduction gear mechanism 7 and the gear of the automatic transmission 1 is shifted.

When a voltage value, under which the rotation angle of the manual shaft 5 corresponds to the shifting position instructed by the operation switch portion 25, is outputted on the basis of the output value of the potentiometer 9 learned in shifting described above, the controlling circuit 21 stops the output to the actuator driving circuit 19, so that the driving of the actuator 3 would be stopped. Thus, the manual shaft 5 is rotated to the instructed correct shifting position so that a correct shifting operation can be carried out.

Further, the precision of fitting in mounting can be lowered since the relation of the shifting position and the output of the potentiometer can be correctly learned regardless of wrong mounting, and thereby, the mounting can be easily performed, so that the productivity can be improved.

In shifting the gear, certain locating can be performed by the detent pin 17 getting over a convex of the detent plate 11 to be fitted to a predetermined concave.

The learning can also be performed after delivery to a user, although it is performed before shipment at a factory so that the system can be adjusted in the above embodiment. For example, it is possible to arrange that the learning mode shown in FIG. 4 being performed every time or regularly at the time of starting of an engine and an accelerator signal being canceled in an electronically controlling type of engine during the learning mode at the time of starting of an engine. Thus, the relation between the shifting position of the automatic transmission and the output value of the potentiometer 9 can be learned at the time of starting of an engine, so that the relation between the shifting position and the output value of the potentiometer 9 would be optimally learned even when the condition becomes wrong in the passage of time, so that correct control can be performed.

Other than such control, it would be also possible to collect, store and learn the data shown in FIG. 3 when a user carries out a shifting operation. In this case, it is possible to arrange that the data is learned when the data at all the shifting positions is stored by storing the shifting operation every time, since a user does not necessarily switch always back and forth at all the shifting positions from P to D1 and from D1 to P.

It is also possible to learn only a stored part of the data, and to collect and learn the other part of the data when a user shifts to the corresponding shifting position. In this case, thus, a relation between the shifting position and an output value of the potentiometer 9 can also be learned by carrying out the above data learning regularly even in the case of wrong mounting due to a change during the passage of time, and thereby, correct shifting can always be performed.

It is sometimes difficult to discriminate between a rush current and the electric current, which occurs at the time when the detent pin 17 gets over a convex of the detent plate 11, by carrying out the above judgment in respect to only one section where the detent pin 17 gets over one convex of the detent plate 11, since the rush current occurs in the first driving by the actuator 3. Therefore, it is preferable to carry out the learning on the basis of the data for a plurality of sections where the detent pin 17 gets over a plurality of convexes.

Second Embodiment

Figure 5:
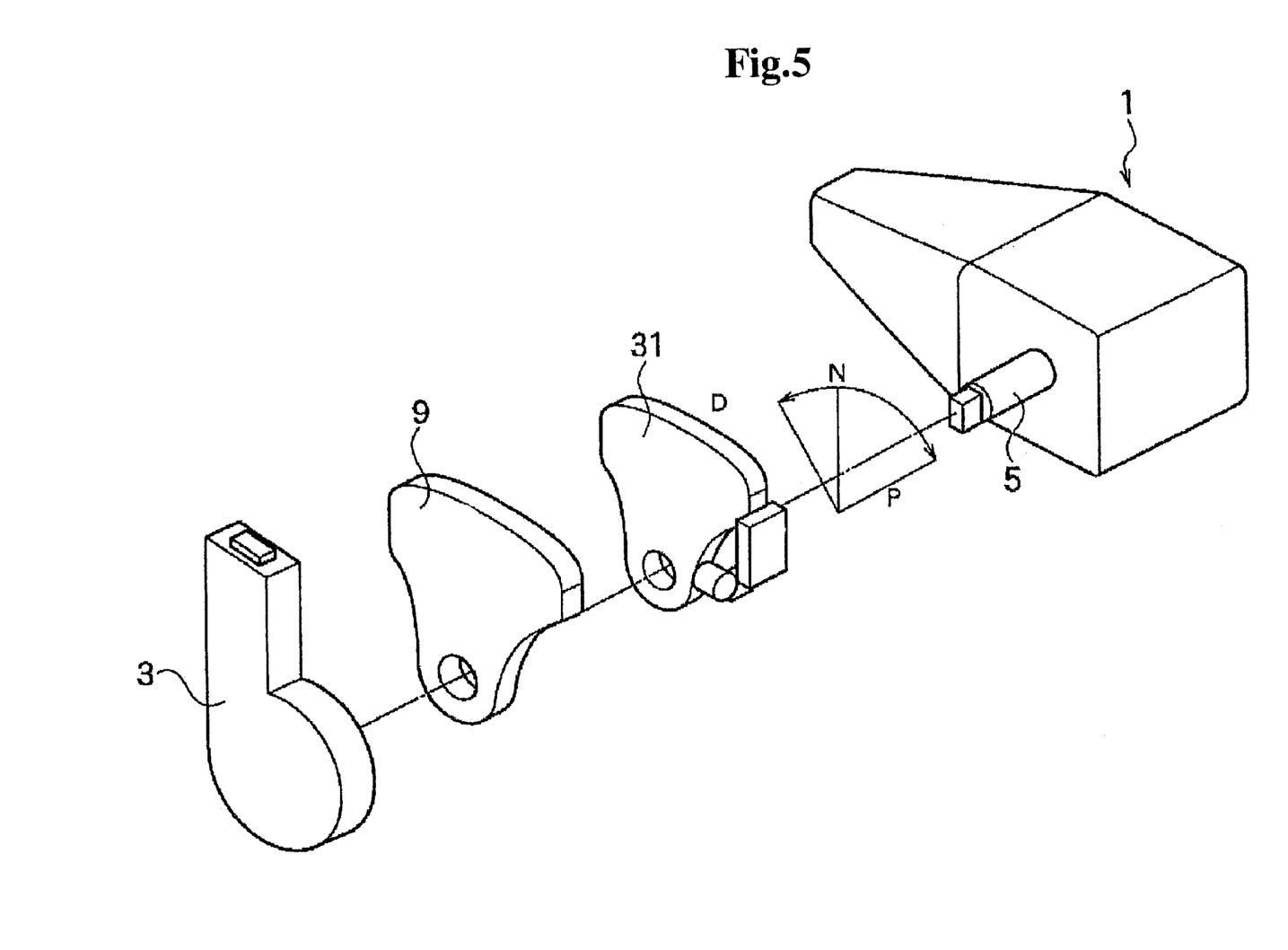
FIG. 5 is an exploded perspective view of a shift driving system in an automatic transmission according to the second embodiment of the invention.
Figure 6:
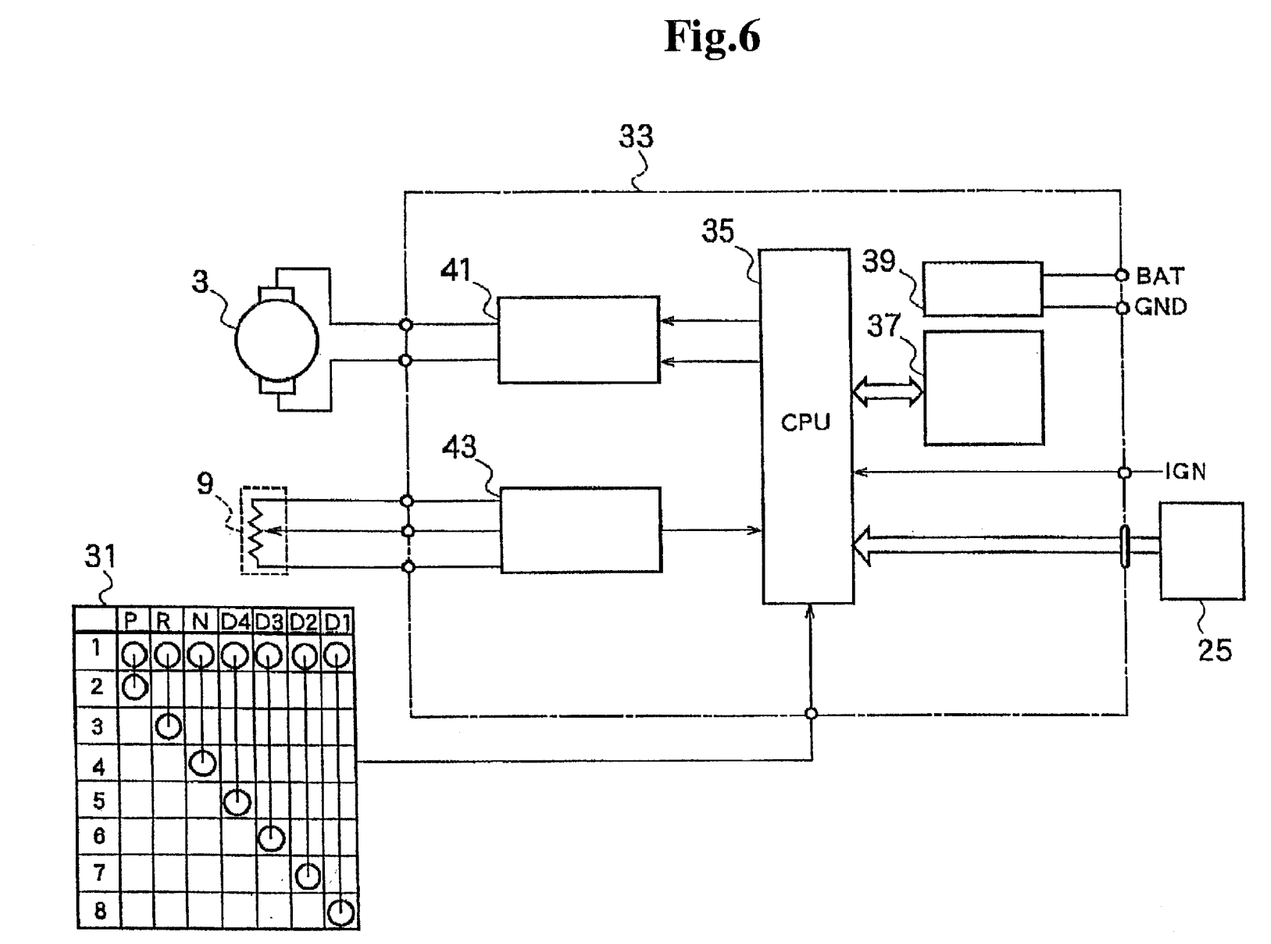
FIG. 6 is a block diagram of a system according to the second embodiment.
Figure 7:
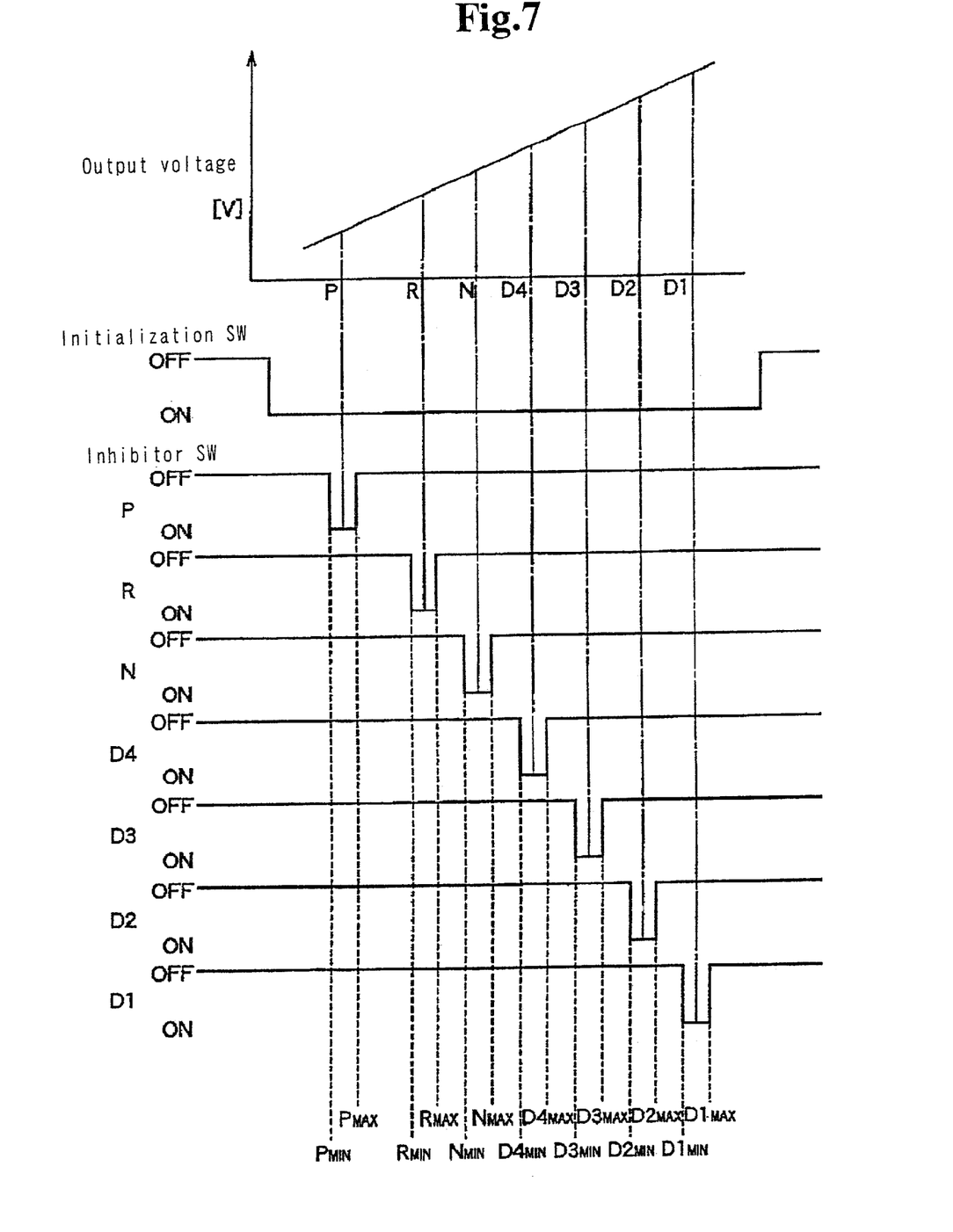
FIG. 7 is a graph illustrating a mechanism of learning according to the second embodiment.
Figure 8:
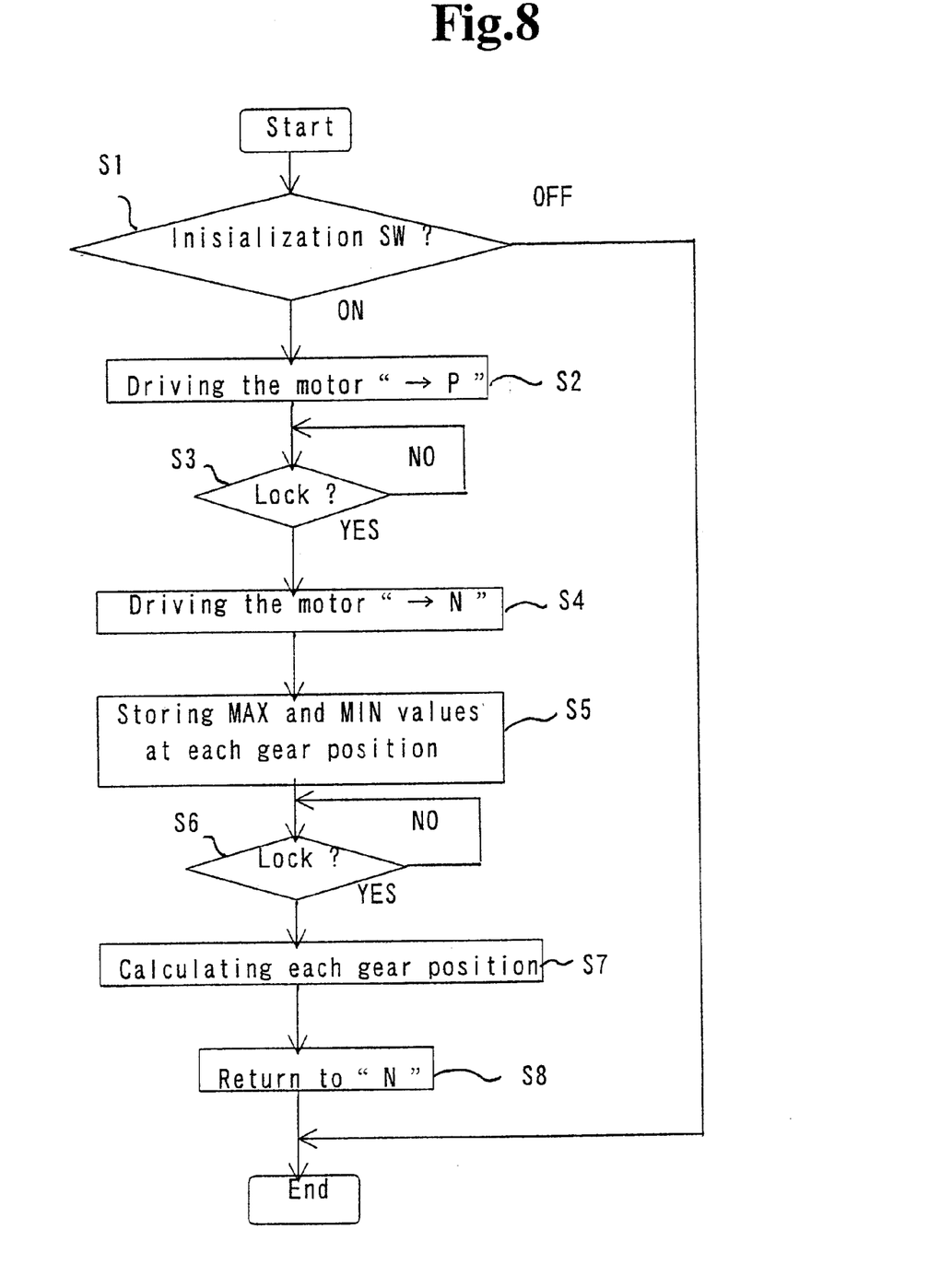
FIG. 8 is a flowchart according to the second embodiment.

FIGS. 5 to 8 relates to a second embodiment of the invention. FIG. 5 is an exploded perspective view of an integral part. FIG. 6 is a block diagram of a system. FIG. 7 is a timing chart. FIG. 8 is a flowchart. Elements corresponding to those of the first embodiment will be marked with the same references in the following description.

First, in this embodiment, the manual shaft 5 is provided with the electric actuator 3 comprising a direct current motor, the potentiometer 9 as a rotation position detecting unit for detecting a rotation angle of the manual shaft 5, and an inhibitor switch 31 for detecting a shifting position of the automatic transmission 1, as shown in FIG. 5.

The inhibitor switch 31 comprises a contact for every shifting position, which conducts to detect the shifting position of the manual shaft 5. The output of the above inhibitor switch 31 can supply a power to a starter in order to start the engine at the parking range P and the neutral range N.

An operator can manually adjust a rotation to achieve correct locating for the shifting position in mounting the inhibitor switch 31. A voltage value of the potentiometer 9 for a rotation position changes straight, but actually, the change of the voltage value is sometimes non-linear, even little, due to dispersion of a resistance value in manufacturing. Therefore, correct mounting by an operator is difficult in many cases.

In this embodiment, it is arranged to perform learning of the potentiometer 9 by using the inhibitor switch 31 correctly located as described above. A structure of the system is shown in FIG. 6. The structure shown in FIG. 6 is roughly same as that of the first embodiment shown in FIG. 2. In the structure shown in FIG. 6, controlling means 33 is provided with a CPU 35 having a structure corresponding to the controlling circuit 21, a storing portion 37, and a power supply circuit 39. A motor driver 41, which is same as the actuator driving circuit 19, is also provided and a potentiometer I/F 43, which is not shown in the drawings of the first embodiment, is shown in, FIG. 6.

In this embodiment, the inhibitor switch 31 is connected to the CPU 35. The inhibitor switch 31 is arranged to detect the shifting position by a connection of a contact for every shifting position P R, N, D4, D3, D2 and D1 to the ground, and to input a detection signal to the CPU 35.

A mechanism of learning in this embodiment is shown in FIG. 7. The upper part of FIG. 7 shows a change in an output voltage value of the potentiometer 9, and the lower part shows rising and falling outputs at each shifting position of the inhibitor switch 31. In the inhibitor switch 31, an initialization switch initializes an output level at the on and off time. The outputs shown at the lower part in FIG. 7 can be attained at each shifting position P, R, N, D4, D3, D2 and D1 by rotating the actuator 3 and driving the manual shaft 5.

At the shifting position P, the falling output $P_{MIN}$ and the rising output $P_{MAX}$ can be attained, and similarly, the falling and rising outputs $R_{MIN}$, $R_{MAX}$, $N_{MIN}$, $N_{MAX}$, $D4_{MIN}$, $D4_{MAX}$, $D3_{MIN}$, $D3_{MAX}$, $D2_{MIN}$, $D2_{MAX}$, $D1_{MIN}$ and $D1_{MAX}$ can be attained at the shifting positions R, N, D4, D3, D2 and D1. The shifting position is calculated on the basis of such output by the following formula:

$$\text{shifting position } x = X_{MIN} + (X_{MAX} - X_{MIN})/2$$

wherein x=P, R, N, D4, D3, D2, D1. The calculated shifting position is shown at the location shown by a single-dotted line in FIG. 7 as the center value of an output value of the inhibitor switch at each shifting position. The output voltage value of the potentiometer 9 at each shifting position P, R, N, D4, D3, D2 and D1 corresponding to the calculated shifting position is learned as a relation between the calculated shifting position and the output value of the potentiometer 9.

Next, an operation will be described with reference to a flowchart shown in FIG. 8. Switching of the controlling means 33 to a learning mode starts the flowchart shown in FIG. 8. The timing for setting the learning mode may be same as that of the first embodiment.

In Step S1, "whether the initialization switch SW is on or not" is judged. The process goes to Step S2 when the initialization switch SW is on, while it ends when the initialization switch SW is off.

In Step S2, a process of "driving the motor in the direction of the position P" is carried out so that the actuator 3 would be driven on the basis of a signal, which is outputted by the CPU 35 to a motor driver 41, in the direction of P from the position N in mounting.

In Step S3, "whether the motor is locked or not" is judged. The manual shaft 5 rotates until it is driven to a value of the operational limit as described above. When it reaches the operational limit, a process of "driving the motor in the direction of the position D" is carried out in Step S4. In this process, the actuator 3 rotates the manual shaft 5 from the position P to D. Then, a process of "storing a MAX value and a MIN value at each gear position" is carried out in Step S5. According to this process, the falling and rising output values of the inhibiting switch shown in FIG. 7 are stored and then, "whether the motor is locked or not" is judged in Step S6. The manual shaft 5 is rotated in accordance with the result of Step S6 until it reaches the operational limit on the D1 side. A process of "calculating each gear position" is carried out in Step S7 when the manual shaft 5 reaches the operational limit.

In the process in Step S7, the shifting position x is calculated by the formula for calculation so that the relation between each calculated shifting position x and the output value of the potentiometer 9 is learned correspondingly.

According to such learning, the relation between the shifting position and an output value of the potentiometer 9 can be correctly learned regardless of wrong mounting, so that the correct control can be achieved.

In Step S8, a process of "returning the gear to the position N" is carried out. In the process, the actuator 3 drives the manual shaft 5 to return the shifting position to the position N, and then, the process ends.

Accordingly, the relation of the shifting position and an output value of the potentiometer 9 can also be correctly learned in this embodiment by using the inhibitor switch 31 located in relation to the automatic transmission 1 to solve a difference of the shifting position due to wrong mounting, dispersion of a resistance value of the potentiometer 9 in manufacturing, or individual difference on a side of the automatic transmission 1 and to calculate the shifting position. Therefore, the potentiometer 9 can correctly detect the shifting position of the manual shaft 5 and the controlling unit 33 can correctly drive and control the actuator 3, when the actuator 3 rotates and drives the manual shaft 5.

Further, the precision of fitting in mounting can be lowered since the relation of the shifting position and the output of the potentiometer can be correctly learned regardless of wrong mounting, and thereby, the mounting can be easily performed, so that the productivity can be improved.

Moreover, detecting the shifting position by the inhibitor switch 31 enables a power to be supplied to a starter in order to start the engine at the ranges P and N, for example.

Although it is arranged that the relation with the potentiometer 9 is learned by calculating all the shifting positions in this embodiment, it may be possible to learn a relation between all the shifting positions and an output values of the potentiometer 9 by calculating at least one shifting position as well as storing in advance the relation between the rotation angle and the voltage value of the potentiometer so as to calculate a difference in the voltage value of the potentiometer 9 at a reference position, which is based on at least one of the calculated shifting positions, and then, add or reduce the amount of the difference at each shifting position.

What is claimed is:

1. An adjustment system in an automatic transmission including:
    an electric actuator for switching a shifting position by rotating a manual shaft;
    a shift operating unit for instructing said shifting position to output an instruction signal;
    a rotation position detecting unit for detecting a rotation angle of said manual shaft on the basis of an output signal corresponding to said rotation angle;
    a locating unit, which is provided with a concave and convex portion corresponding to said each shifting position, for locating said manual shaft by a detent pin getting over a convex to be fitted in a predetermined concave in shifting; and
    a controlling unit for driving and controlling said actuator until a rotation position, which is detected by said rotation position detecting unit in response to the receipt of the instruction signal from said shift operating unit, accords with the instructed shifting position, wherein the adjustment system comprises:
        an electric current detecting unit for detecting a driving current of said actuator;
        a shifting position calculating unit for calculating a shifting position of said manual shaft on the basis of detection by said electric current detecting unit of a change in the driving current of the actuator at the time when said detent pin gets over a convex to be fitted in a predetermined concave in shifting; and
        a rotation position detection learning unit for learning a relation between the shifting position calculated by said shifting position calculating unit and an output value of said rotation position detecting unit.

2. The adjustment system in an automatic transmission according to claim 1, wherein:
    said electric current detecting unit detects a change in a driving current at the time when said manual shaft is rotated back and forth so that said actuator can switch all the shifting positions back and forth, and
    said shifting position calculating unit calculates all the shifting positions on the basis of the change in the driving current.

3. An adjustment system in an automatic transmission including:
    an electric actuator for switching a shifting position by rotating a manual shaft;
    a shift operating unit for instructing said shifting position to output an instruction signal;
    an inhibitor switch for detecting the above-mentioned shifting position;
    a rotation position detecting unit for detecting a rotation angle of said manual shaft; and
    a controlling unit for driving and controlling said actuator until a rotation position, which is detected by said rotation position detecting unit in response to the receipt of the instruction signal from said shift operating unit, accords with the instructed shifting position, wherein the adjustment system comprises:
        a shifting position calculating unit for calculating a shifting position of said manual shaft on the basis of an output of said the inhibitor switch in shifting; and
        a rotation position detection learning unit for learning a relation between the shifting position calculated by said shifting position calculating unit and an output value of said rotation position detecting unit.

4. The adjustment system in an automatic transmission according to claim 3, wherein said shifting position calculating means calculates at least one shifting position of said manual shaft on the basis of rising and falling outputs of said inhibitor switch at the time when said actuator rotates said manual shaft so as to switch at least one shifting position.

5. The adjustment system in an automatic transmission according to claim 3, wherein said shifting position calculating unit calculates all the shifting positions of said manual shaft on the basis of rising and falling outputs of the inhibiting switch at the time when the said actuator rotates the said manual shaft so as to switch all the shifting positions.

* * * * *